UNITED STATES PATENT OFFICE.

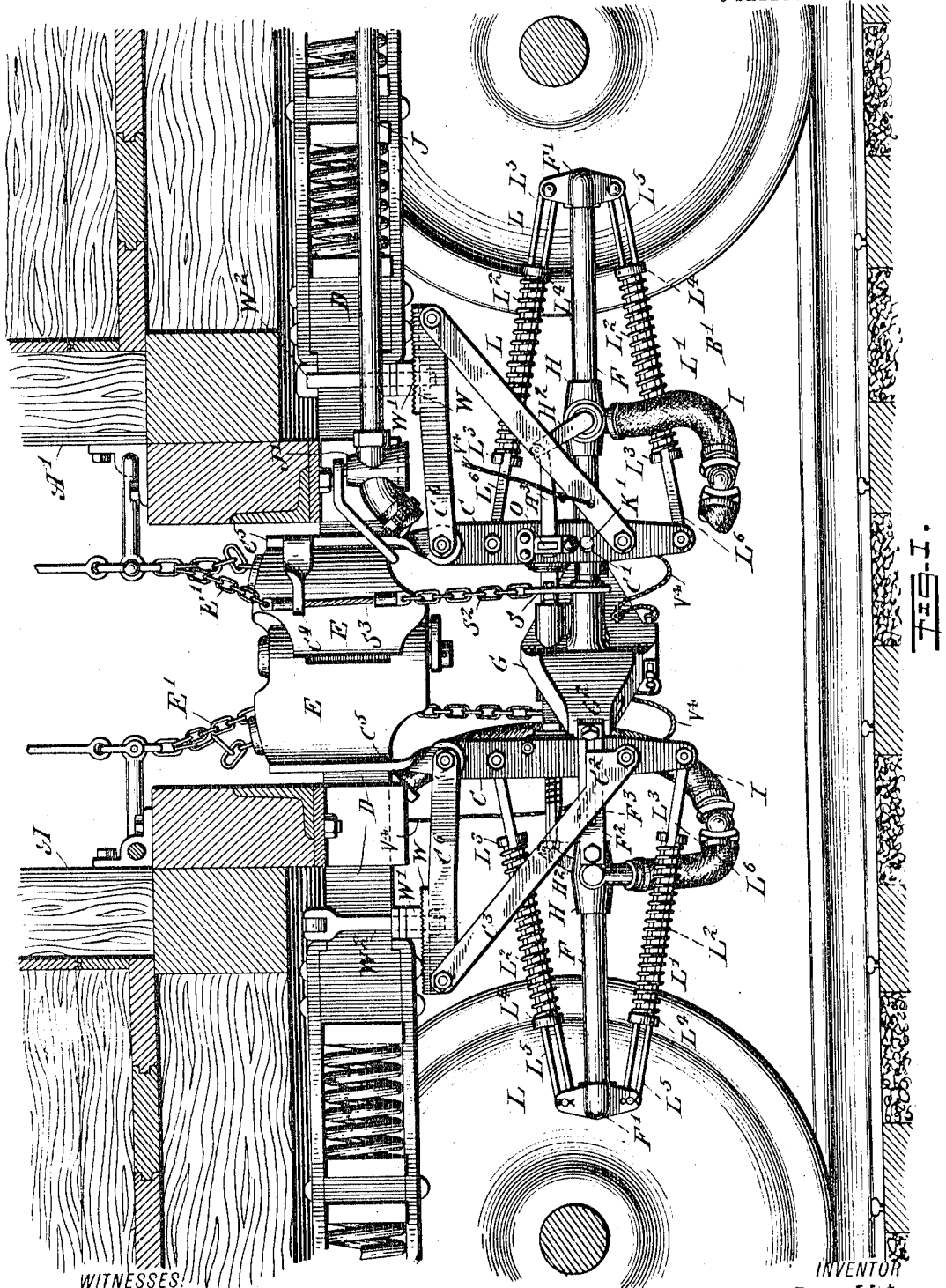

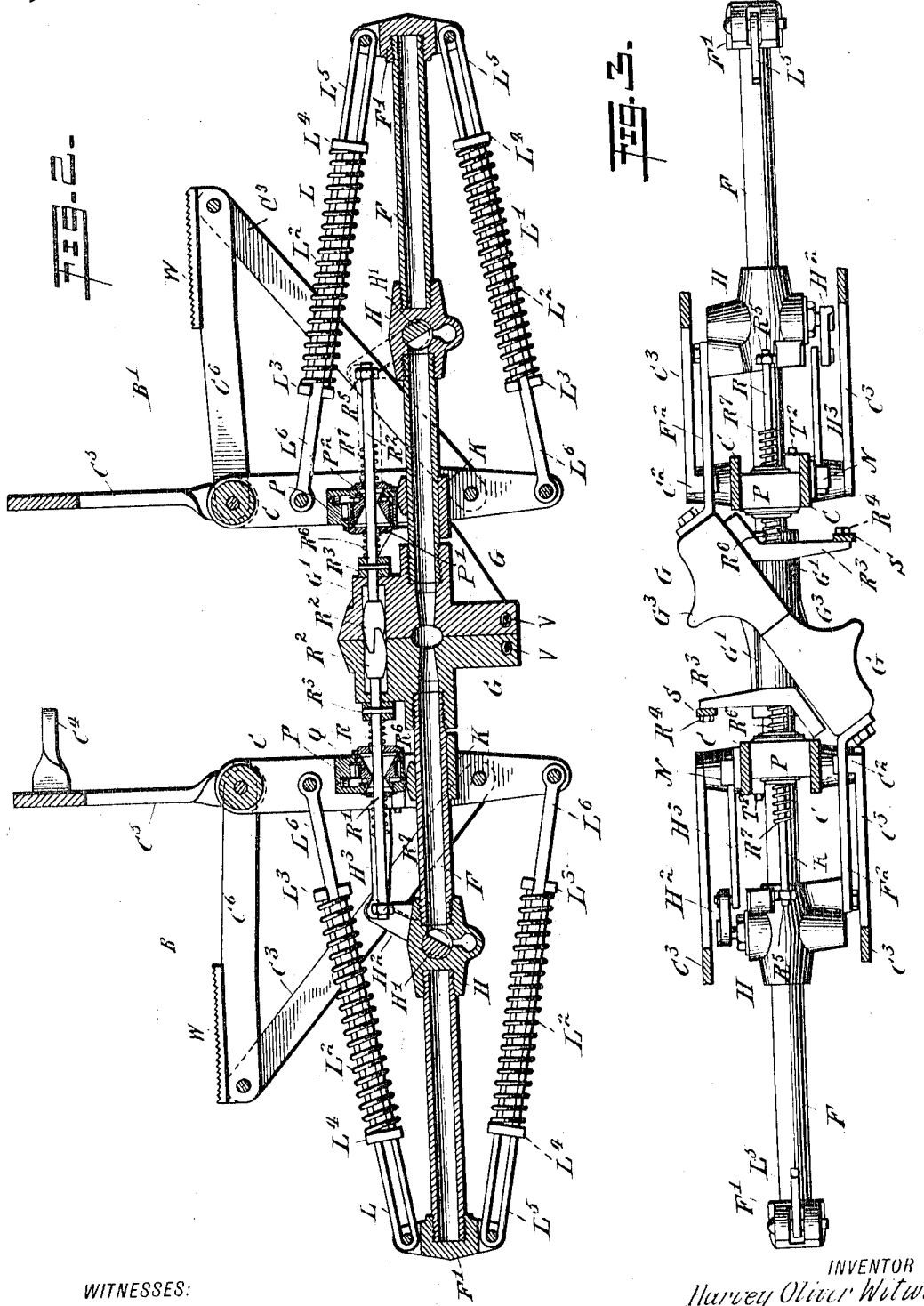

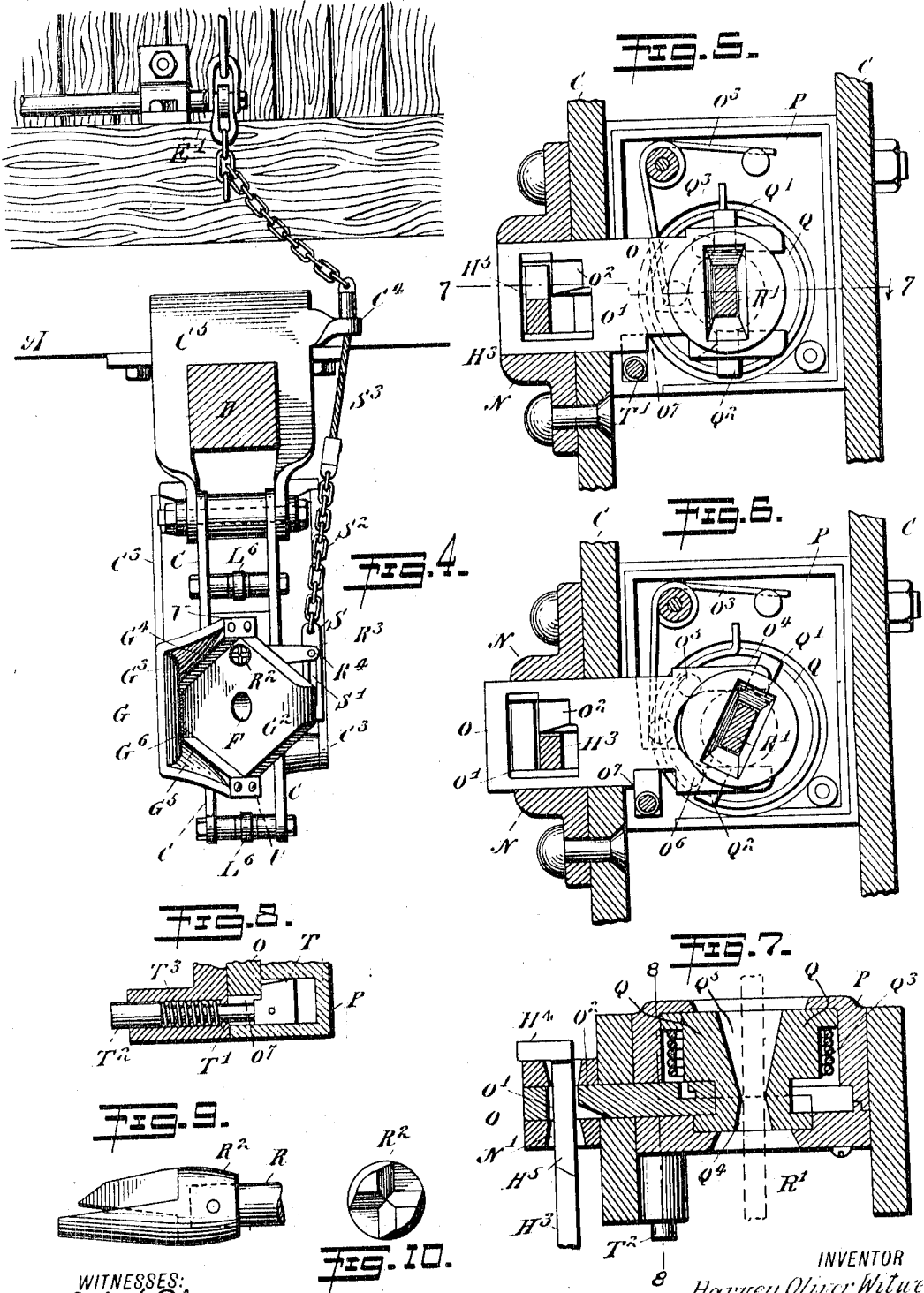

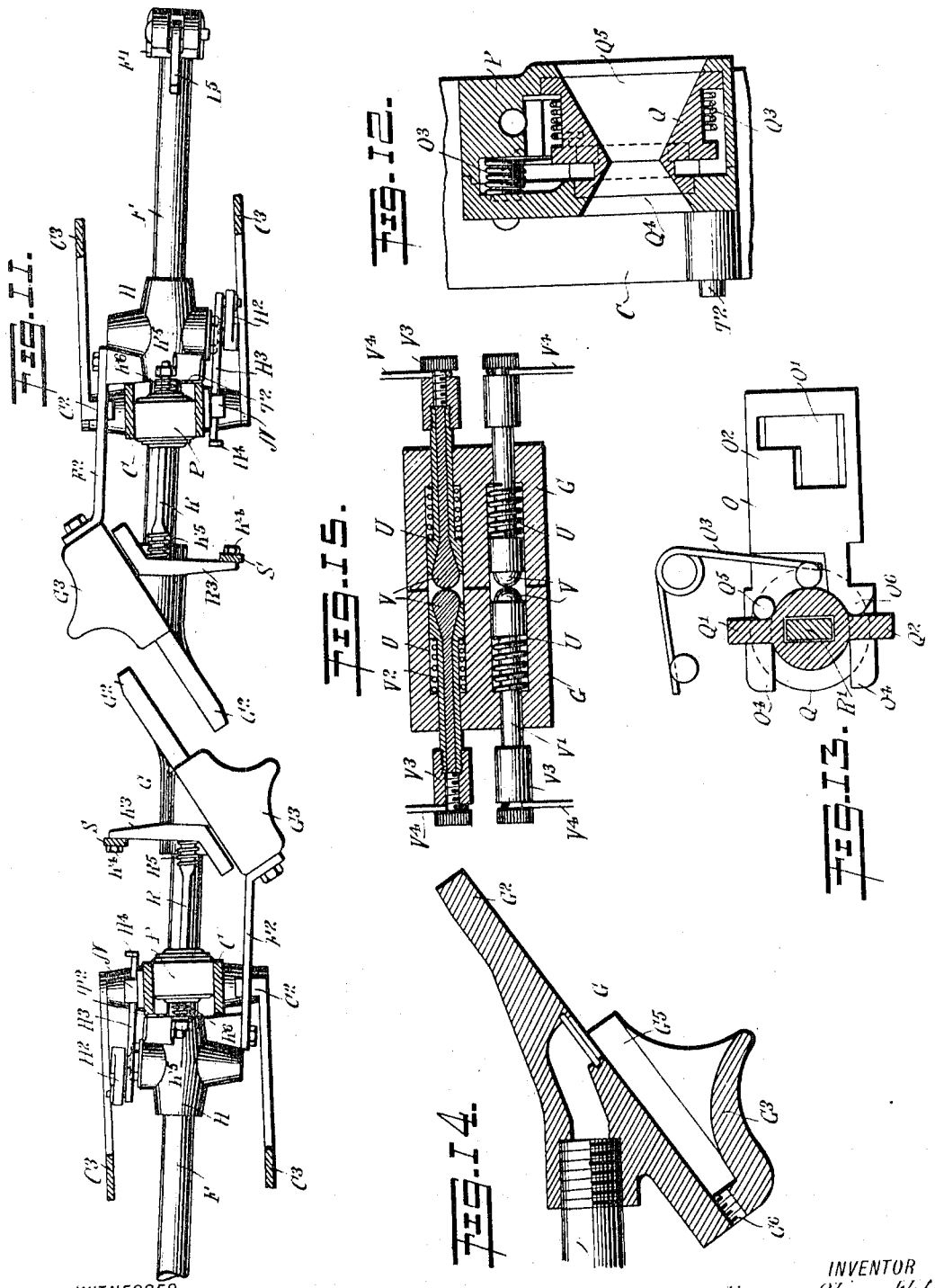

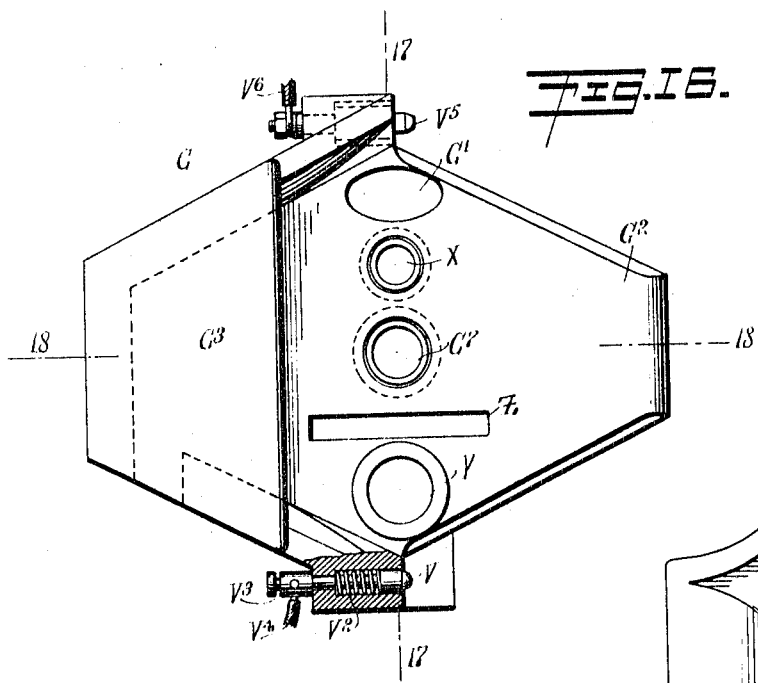
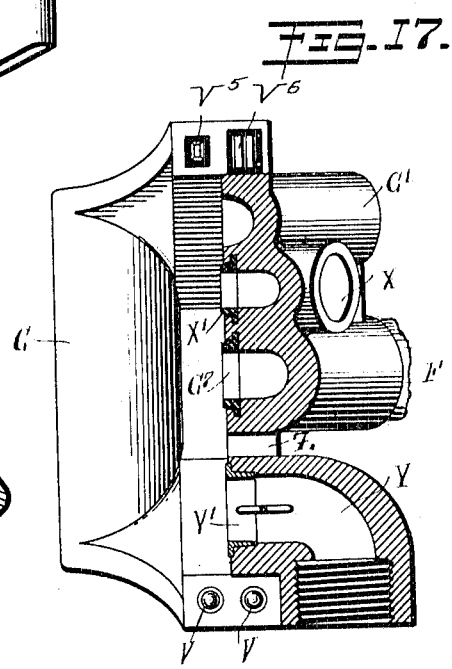
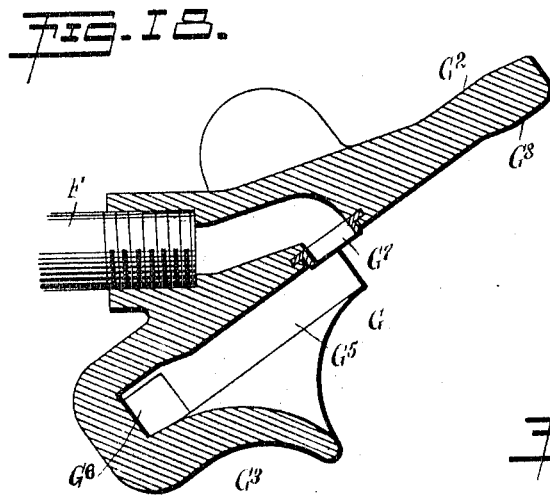
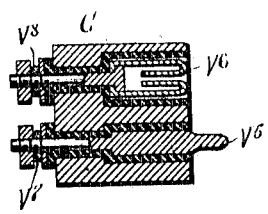

HARVEY OLIVER WITWER, OF NEW HAMBURG, ONTARIO, CANADA; JOHN WITWER ADMINISTRATOR OF SAID HARVEY OLIVER WITWER, DECEASED.

TRAIN-PIPE COUPLING.

1,102,206.  Specification of Letters Patent.  Patented June 30, 1914.

Application filed September 24, 1910, Serial No. 583,629. Renewed May 16, 1914. Serial No. 839,145.

*To all whom it may concern:*

Be it known that I, HARVEY OLIVER WITWER, a subject of the King of Great Britain, and a resident of New Hamburg, Ontario, Dominion of Canada, have invented a new and Improved Train-Pipe Coupling, of which the following is a full, clear, and exact description.

The invention relates to train pipe couplings for conducting air, steam, electricity and other fluids from one part to another for braking, signaling, heating and other purposes.

The object of the invention is to provide a new and improved automatic train pipe coupling, arranged to insure an automatic coupling of the train pipes of two cars coming together, to cut off the fluid pressure in the train pipes on the cars being uncoupled, to cause an emergency application of the fluid pressure brakes in case the cars accidentally break apart, and to provide electrical connection between adjacent cars for a return circuit telephone and electrical signaling system and for electric power transmission, either lighting or motive power.

For the purpose mentioned, use is made of a coupling head attached to a coupling pipe moving bodily with the draw bar, and having movement independent of the draw bar in both a longitudinal and lateral direction, the coupling pipe being provided with a valve controlled by the movement of the coupling pipe and its head.

A practical embodiment of the invention is represented in the accompanying drawings forming a part of this specification, in which similar characters of reference indicate corresponding parts in all the views.

Figure 1 is a side elevation of the train pipe coupling as applied to two cars coupled together and shown in section; Fig. 2 is a sectional side elevation of the pipe coupling, showing the two coupling members of adjacent cars coupled together; Fig. 3 is a plan view of the same, parts being in section; Fig. 4 is an enlarged front elevation of one of the coupling members in position on the car: and previous to the coupler assuming the secondary angle of approach; Fig. 5 is an enlarged cross section of the locking and releasing device for the rod to control the valve in the coupling pipe; Fig. 6 is a like view of the same, showing the parts in a different position; Fig. 7 is a sectional plan view of the same on the line 7—7 of Fig. 5; Fig. 8 is a sectional side elevation of a latch for the valve operating rod, the section being on the line 8—8 of Fig. 7; Fig. 9 is an enlarged side elevation of one of the coupling heads for the valve-operating rod; Fig. 10 is a front end view of the same; Fig. 11 is a plan view partly in section, of opposite coupling members in open non-coupling position; Fig. 12 is an enlarged cross section of the spool and its casing; Fig. 13 is a cross section of the spool in engagement with the slide for the valve-operating rod; Fig. 14 is an enlarged sectional plan view of the coupling head of a coupling pipe; Fig. 15 is an enlarged sectional plan view of the electrical contacts in position in the coupling heads shown in coupled position; Fig. 16 is a side elevation partly in section, of a coupling head of modified form and such as is intended for use on couplings for passenger cars; Fig. 17 is a cross section of the same on the line 17—17 of Fig. 16; Fig. 18 is a sectional plan view of the same on the line 18—18 of Fig. 16; and Fig. 19 is a sectional plan view of the electrical connection for electric power transmission.

The cars A, A′ are provided at their ends with fluid pressure coupling members B, B′, mounted on supports or hangers C, C, depending from and moving bodily with the draw bars D, D, mounted to slide in the usual manner on the cars A, A′, and provided with coupling members E, E, of any approved type. The coupling members B, B′ are alike in construction, and hence it suffices to describe but one in detail. A coupling pipe F terminates at its forward end in a coupling head G, in the rear of which is located a valve H connected by a hose I with the train pipe J, extending under the car A (A′) in the usual manner, and provided with an angle cock J′ normally open. The pipe F is mounted to slide in the direction of its length in a bearing K, provided on its sides with trunnions K′ (see Fig. 1) extending in elongated slots C′ formed in the side of the support or hanger C, so that the bearing K can swing up and down and with it the pipe F, and the bearing K can also turn in a lateral direction owing to the elongation of the slot C′, as will be readily understood by reference to Fig. 1. The coupling pipe F and its coupling head G are normally held in a forward position by the action of spring devices L, L′, connected at their ends to a head F′, closing the rear end of the corresponding coupling pipe F, and the said spring devices L, L′ are connected at their forward ends to the support or hanger C, the spring device L extending upwardly and forwardly from the head F′ to the support C, while the spring device L′ extends forwardly and downwardly from the head F′ to the support C. Each spring device L, L′ consists of a spring $L^2$ pressed on at the ends by collars $L^3$, $L^4$ held on the rods $L^5$, $L^6$, extending through the springs $L^2$ in opposite directions, to connect with the head F′ and the support C, respectively, as will be readily understood by reference to Figs. 1 and 2. The rear rods $L^5$ of the spring devices L, L′ are preferably in the form of links having a sliding engagement with the head F′.

The spring devices L, L′ operate in conjunction with a bar $F^2$ and a pin $C^2$, to hold the pipe F in the angular position shown in Fig. 11, that is, holding the pipe in a horizontal plane at an angle to the longitudinal center line of the car. The bar $F^2$ is secured at its forward end to the rear end of the head G, and the said bar $F^2$ is secured at its rear end to the valve H, and is provided between its ends with a lengthwise-extending slot $F^3$, into which projects the pin $C^2$, extending transversely from the brace $C^3$ forming part of the support C. When the cars are uncoupled the pin $C^2$ is at the rear end of the slot $F^3$, and the spring devices L, L′ are under sufficient tension to pull the pipe F to an angular position, the trunnions K′ of the bearing K permitting such movement of the bearing K and its pipe F. The angular position of the pipe F in a transverse direction moves the coupling head G into what I prefer to call secondary angle of approach, as indicated in Fig. 11. The bar $F^2$ also serves as a guide to prevent the pipe F and the head G from revolving.

The valve H is provided with a valve plug H′ for connecting the hose I with the pipe F or disconnecting the same, and on one outer end of the valve plug H′ is secured an arm $H^2$ connected with a valve-operating rod $H^3$ terminating in a head $H^4$, and having a cut-out portion $H^5$ adjacent to the said head, as will be readily understood by reference to Figs. 5, 6 and 7. The rod $H^3$ is mounted to slide lengthwise in a bearing N′ formed in a bracket N attached to the support C, and it also passes through an opening O′ formed in a slide O, mounted to slide transversely in the bracket N and the support C, as plainly indicated in Figs. 5, 6 and 7. The slide O is provided at the opening O′ with a beveled portion $O^2$ for engagement with the cut-out portion $H^5$ in the valve-operating rod $H^3$ (see Fig. 6). The inner end of the slide O projects into a casing P, attached to the support C, and the said inner end of the slide is pressed on by a spring $O^3$ held in the casing P and serving to normally hold the slide O in an innermost position, as shown in Fig. 5. The inner end of the slide O terminates in a fork $O^4$ provided with lugs $O^5$, $O^6$, adapted to be engaged by projections Q′, $Q^2$ held on a tumbler or spool Q, mounted to turn in the casing P, the said spool Q being pressed on by a torsion spring $Q^3$, one end of which is secured to the casing P and the other to the peripheral face of the spool Q. The spool Q is provided with a central opening formed of two converging parts $Q^4$, $Q^5$, united at their apexes, and through this opening extends the polygonal portion R′ of a rod R, provided with a cylindrical coupling head $R^2$, engaging a bearing G′ formed in the coupling head G, as plainly indicated in Fig. 2. The coupling head $R^2$ is round and is preferably in the form of a fork, the members of which are adapted to engage the corresponding members of the coupling head $R^2$ in the other coupling head G at the time the cars A and A′ are coupled together, as indicated in Fig. 2. It is understood that when this takes place the coupling heads $R^2$ interlock with each other, so that when one rod R is turned it turns the other rod with it in the same direction.

The rod R is provided adjacent to the coupling head G with a transversely-extending arm $R^3$, provided at its free end with a pin $R^4$, engaging a slot S′ formed in an upright link S attached on the lower end of a chain $S^2$, connected at its upper end with a cable $S^3$, mounted to slide in a bearing $C^4$ forming part of the support C near the upper end thereof, as plainly indicated in Figs. 1, 2 and 4. The upper end of the cable $S^3$ is connected with a manipulating device E′ for the coupling E, so that the rods R are turned on uncoupling the couplings E when actuating the device E′. Now when the rods R are turned the tumblers Q are turned with the rods to cause the projection Q′ or $Q^2$ to act on the corresponding lug $O^5$ or $O^6$, with a view to shift the slide O in a transverse direction from the normal position shown in Fig. 5 to the position shown in Fig. 6, to engage the projection $O^2$ with the cut-out portion $H^5$ in the valve-operating rod $H^3$. Now when the cars A, A′ move apart the rods $H^3$ are held locked by the slides O, and consequently move with the supports C, while the bearings K allow the pipes F to slide therein, so that the coupling heads G remain coupled and at the same time the operating rods $H^3$ impart a swinging motion to the arms $H^2$, to move the valve plugs H′ into a closed position, thereby breaking communication between the hose I and the pipe F. The outer end of each rod R is provided with a nut R⁵ and on the rod R' are arranged coil springs R⁶, R⁷, of which the spring R⁶ is intermediate the front cover P' of the casing P and the arm R³, while the spring R⁷ abuts against the rear cover P² of the casing P and is adapted to be engaged by the nut R⁵, to cushion the rod R in its lengthwise movement.

The slide O is provided at its under side with a cut-out portion O⁷, adapted to be engaged by a catch T, mounted to slide in the casing P (see Fig. 8), and having a stem T' terminating in an enlarged head T², projecting beyond the rear of the casing P, to abut against the valve H, so as to move the catch T out of engagement with the notch O⁷. A spring T³ is coiled on the stem T' and presses against the head T² to normally hold the catch T in engagement with the notch O⁷, and the spring T³ is pressed when the outer end of the head T² is pressed inward on moving in engagement with the valve H. When this takes place the catch T releases the slide O, so as to allow the latter to return to its normal position by the action of the spring O³, the spring Q³ then returning the tumbler Q likewise to its normal position. The coupling head G is preferably in the form of a diamond, as indicated in the drawings, the forward half portion forming a shoe G², while the rear end is provided with a pocket G³, and the rear half portion is provided on the face of the coupler head with guides G⁴, G⁵, extending along the top and bottom margins of the rear portion of the head. The forward end of the pocket G³ is curved outwardly, so as to permit convenient entrance of the shoe G² of the opposing coupling head when the cars A, A' are coupled together, it being understood that when this takes place the top and bottom edges of the entering shoe are guided in position and engage the guides G⁴, G⁵, so as to insure a firm contact between the faces of the two coupling heads G of opposing cars, and whereby the coupling heads are centered, that is, the coupling pipes F are moved into register with each other and likewise the bearings G' containing the coupling members R². The pockets G³ of the coupling heads G are preferably provided with holes G⁶ for the escape of snow or other extraneous matter that may pass into the pockets G³. The coupling head G is provided with a gasket G⁷ in the entrance opening for the pipe F, and this gasket G⁷ is preferably of rubber and projects beyond the face of the coupling head G. The top and bottom of the coupling head G are provided with guideways U, for the reception of pairs of contacts V for making electrical connections between adjacent cars for return circuit telephone and electric signaling systems and for electric power transmissions for lighting or motive power, etc. Each metallic contact V is held in a plunger V' (see Fig. 15), of insulating material, and mounted to slide in the corresponding guideway U and pressed on by a spring V², to normally project the rounded off head of the contact beyond the front face of the coupling head G when the latter is in uncoupled position. The rear end of the contact V and plunger V' is provided with a binding post V³ for the attachment of the insulated conductor V⁴ supported by the coupling head G and the support C (see Fig. 1), and extending to the corresponding car A or A'.

The contact V above described is preferably for use in transmitting electrical energy for telephone signaling purposes and the like, and is arranged at the bottom of the coupling head, but for power transmission the construction shown in Figs. 17 and 19 is preferred. In this case a contact of large area is provided at the top of the coupling head G by the use of an insulated fixed contact V⁵ projecting beyond the face of the coupling head, and a yielding insulated contact V⁶, arranged with a recess in the coupling head adjacent to the fixed contact V⁵, the rear ends of the contacts V⁵ and V⁶ being connected with the circuit wires V⁷ and V⁸, respectively. It is understood that the yielding or spring contact V⁶ of one coupling head G is adapted to receive the projecting end of the contact V⁵ of the opposite coupling head G. By the arrangement described a large contact surface is provided and therefore offers less resistance, and a sliding contact is provided to insure a better contact than with the contacts V, the contacts V⁵ and V⁶ tending to clean one the other. It is understood that the projecting contacts V⁵ are perfectly guarded from injury during coupling, owing to the shoe bringing the contacts sufficiently in line before they engage themselves.

In order to make provision for air signaling purposes and transmission of steam from one car to another (passenger cars mainly) use is made of an air signaling aperture X and a steam aperture Y (see Figs. 16 and 17) formed in the coupling head above and below the central aperture connected with the pipe F. The apertures X and Y are provided with suitable gaskets X' and Y' at the face of the coupling head G, and the rear ends of the said apertures are connected with suitable conducting pipes (not shown), extending under the cars, for the air and steam respectively. In order to prevent undue heating of the gaskets G⁷ and adjacent parts by the steam passing through the aperture Y, use is made of an air space Z intermediate the aperture Y and the central opening for the pipe F. In order to prevent the gaskets G⁷, X² and Y² from being damaged on coupling two heads G, the shoe $G^2$ is provided on its inner face with a raised portion or shoulder $G^3$ (see Fig. 18) so that the central parts of the coupling heads are held out of contact until the shoes $G^2$ are nearly seated in the pockets $G^3$. The shoe portion of the coupling head G is beveled at top and bottom to prevent adherence of dust or other extraneous matter.

The operation is as follows: When the cars A and A′ are uncoupled and approach each other for coupling, then the heads G stand in an angular position, as indicated in Fig. 11, and when the shoes $G^2$ of the two coupling heads G engage each other they press the heads laterally so as to finally bring the pipes F in alinement and in register with each other as soon as the heads G are firmly coupled together, that is, the shoes $G^2$ have passed into the pockets $G^3$. Suitable rubber gaskets may be arranged at the faces of the coupling heads G at the entrance ends to the pipes F, so as to prevent leakage. Now, as the cars move farther together, the pipes F slide in their bearings K in opposite directions, so that the spring devices L, L′ for each coupling member B, B′ are placed under hard tension and consequently the faces of the coupling heads G are firmly pressed together and are held pressed together under the tension of the said spring devices L, L′. When the heads G of the two coupling members B and B′ are coupled together, the heads $R^2$ of the rods R are likewise coupled together, and when the cars A and A′ move to final coupling position, it is evident that the supports C move toward each other and consequently the heads $H^4$ of the rods $H^3$ are carried along, whereby the rods $H^3$ are shifted to turn the valve plugs H′ into the open position shown in Fig. 2, to connect the train pipes J of the adjacent cars A and A′ with each other, and thus allow fluid pressure to pass from the train pipe of one car to the train pipe of the other car. It will also be noticed that when the heads G of the two coupling members B and B′ are coupled together, the contact devices V in the two coupling heads are moved in firm contact with each other, so as to establish electrical connection between the two cars.

It is understood that when the cars A and A′ are uncoupled the valves H are closed, and when the cars are moving into coupling engagement, the coupling heads G, G are coupled together prior to the coupling of the draw heads D, D, so that the spring devices L, L′ are placed under heavy tension when the cars are finally coupled together; and it will also be noticed that on the final coupling movement of the draw heads D, D the supports C, by the mechanism shown in Figs. 5, 6 and 7, cause lengthwise movement of the rods $H^3$, to move the valves H into open position with a view to connect the train pipes J, J of the cars A, A′ with each other. When the cars are uncoupled and move apart, with the link S raised and the arms $R^3$ swung upward to turn the rods R, as previously explained, then the valves H are closed to prevent the fluid pressure from passing out of the train pipes into the atmosphere by way of the now disconnected pipes F. It is understood that owing to the arrangement described, the rods $H^3$ are held against movement during the time the heads G separate, so that the valves H are turned into closed position, and as the spring devices L, L′ relax during the uncoupling, the catch T is released from the slide O to unlock the latter and allow the same to return to normal position, thus allowing the rods $H^3$ to move in unison with the pipes F. In case the cars A, A′ break accidentally apart and the rods $H^3$ are not locked by the slides O, then the rods $H^3$ move with the pipes F and hence the valves H remain open after the heads G, G are disengaged, to allow air to escape from the train pipe J, with a view to apply the brakes for an emergency stop. In case it is necessary to open the draw head on an uncoupled car, the operating device E′ is manipulated, and the rod R and its coupling head $R^2$ is turned, but as the catch T is held withdrawn from the slide O, the latter is not locked and hence the parts return to normal position, as shown in Fig. 5, as soon as the operating device E′ is returned to normal position.

By constructing the spring devices L, L′ in the manner described, they are not liable to be strained, and they tend to hold the coupling pipes F in horizontal position at the time the cars are uncoupled, and the spring devices readily yield to allow proper coupling of the coupling heads G even should the same stand at different heights, as the pipes F can swing up or down to compensate for any discrepancy.

The construction of the coupling heads G insures positive coupling of the same, without danger of leakage of the fluid pressure, as the contacting faces are interlocked, that is, the shoe of one head engages the pocket of the other head. It will also be seen that all jars, jolts and stresses are readily taken up by the spring devices L, L′, thus relieving the coupling heads G of undue strains.

By the co-action of the spring devices L, L′, the bar $F^2$ and pin $C^2$, and the forward edge of the valve H abutting up against the hanger C, the coupling pipe F and its coupling head G are held at an angle of approach (see Fig. 11), so that the forward end of the shoe G′ of one head G strikes the other head at about the middle when the heads come together, and when the cars are uncoupled the shoes readily disengage their interlocking pockets owing to the sidewise pressure exerted on the pipe F by the action of the spring devices L, L' operating in conjunction with the bar F² and the pin C².

By locating the revolving coupling head R² within the coupling head G, it is completely protected and takes up little room, and by the construction described the action of the coupling head G is independent of the valve-operating rod H³. When the shoes G² of the coupling heads G come together in the action of coupling and are forced back against the tension of the spring devices L, L', then the springs R⁶ are compressed, thus holding the coupling heads R² in firm engagement with each other. When the cars A and A' separate, the spring devices L, L' force the coupling heads G, G outward and then the nuts R⁵ move into engagement with the springs R⁷ sufficiently early in the movement, so that while the coupling heads G continue to the full extent of their movement, the coupling heads R² are drawn inward into their bearings G' by the action of the said springs R⁷, and hence the coupling heads R² are disengaged one from the other prior to the time of the separation of the coupling heads G, G. From the foregoing, it will be seen that the springs R⁶, R⁷ cushion the lengthwise movement of the coupling heads R².

The supports or hangers C may be of any approved construction, but are preferably in the form of links hung at their upper ends on a bracket C⁵, attached to or forming part of the coupling members B, and the braces C³, previously mentioned, are connected by links C⁶ with the brackets C⁵, at the junction of the supports C with the said bracket. The top of the link C⁶ is provided with a notched plate W, engaged by a correspondingly-shaped cross bar W', hung on links W² from the draw bar D, as plainly indicated in Fig. 1. By the arrangement described, the cross bar W' adjustably engages the plate W, so as to permit of properly adjusting the support or hanger C according to the construction of the car on which the device is applied.

It is understood that by the arrangement described the coupler is held firmly in a true alinement position both laterally and vertically. It will also be noticed that the diverging of the spring devices L provides vertical components whereby the said devices can resist unbalanced forces in a vertical plane within the limits of their strength. The triangularly-arranged members C and L², L² form a yielding truss (i. e. non-rigid) and when the coupler is in uncoupled position, this truss holds the pipe line in a horizontal position. The weight of the yieldingly mounted parts of the coupler are supported by the bearing K located in the frame C and any unbalanced weight tending to tilt the pipe line from the horizontal is resisted by the vertical components of the springs L², L², thereby holding the pipe line in a horizontal position when uncoupled.

The coupler head, although preferably of diamond shape would operate equally well if of oval or elliptical shape, and since the same principles are involved, the coupler head design is not necessarily confined to the limits of diamond shape but includes any geometrical figure so long as the coupler head presents a shoe and a pocket. The shoe is formed by the forward part of the coupler head and the pocket at the rear of the coupler head is formed by guides so shaped that they tend to engage the shoe of an approaching coupler head and direct the approaching shoe to ultimate register and firm seating in the pocket, as is the case in the diamond shaped design illustrated.

Having thus described my invention, I claim as new and desire to secure by Letters Patent:

1. A train pipe coupling, comprising a support depending from the draw bar of the car, a spring-pressed coupling pipe mounted to slide lengthwise on the said support and provided with a valve arranged for connection with a fluid pressure supply, a valve-operating rod connected with the said valve and having a sliding connection with the said support, the said valve-operating rod having a head for engagement by the support to pull the valve-operating rod in one direction to open the valve on the final coupling of adjacent cars, and a manually controlled slide for locking the said valve operating rod on uncoupling the cars.

2. A train pipe coupling, comprising a support depending from the draw bar of the car, a spring-pressed coupling pipe mounted to slide lengthwise on the said support and provided with a valve arranged for connection with a fluid pressure supply, a valve-operating rod connected with the said valve and having a sliding connection with the said support, the said valve-operating rod having a head for engagement by the support to pull the valve-operating rod in one direction to open the valve on the final coupling of adjacent cars, a transverse slide on the said support and adapted to engage the said operating rod on uncoupling the cars, and manually-controlled means for actuating the said slide.

3. A train pipe coupling, comprising a support depending from the draw bar of the car, a spring-pressed coupling pipe mounted to slide lengthwise on the said support and provided with a valve arranged for connection with a fluid pressure supply, a valve-operating rod connected with the said valve and having a sliding connection with the said support, the said valve-operating rod having a head for engagement by the support to pull the valve-operating rod in one direction to open the valve on the final coupling of adjacent cars, a transverse slide on the said support and adapted to engage the said operating rod on uncoupling the cars, manually-controlled means for actuating the said slide, and automatic means for locking and unlocking the said slide.

4. A train pipe coupling, comprising a support depending from the draw bar of the car, a spring-pressed coupling pipe mounted to slide lengthwise on the said support and provided with a valve arranged for connection with a fluid pressure supply, a valve-operating rod connected with the said valve and having a sliding connection with the said support, the said valve-operating rod having a head for engagement by the support to pull the valve-operating rod in one direction to open the valve on the final coupling of adjacent cars, a spring-pressed slide mounted on the said support and adapted to engage the said operating rod on uncoupling the cars, a revoluble tumbler mounted on the said support and controlling the said slide, and manually-controlled means for rotating the said tumbler.

5. A train pipe coupling, comprising a support depending from the draw bar of the car, a spring-pressed coupling pipe mounted to slide lengthwise on the said support and provided with a valve arranged for connection with a fluid pressure supply, a valve-operating rod connected with the said valve and having a sliding connection with the said support, the said valve-operating rod having a head for engagement by the support to pull the valve-operating rod in one direction to open the valve on the final coupling of adjacent cars, a spring-pressed slide mounted on the said support and adapted to engage the said operating rod on uncoupling the cars, a revoluble tumbler mounted on the said support and controlling the said slide, manually-controlled means for rotating the said tumbler, and an automatic means for locking and unlocking the said slide in the shifted position.

6. A train pipe coupling, comprising a support depending from the draw bar of the car, a spring-pressed coupling pipe mounted to slide lengthwise on the said support and provided with a valve arranged for connection with a fluid pressure supply, a valve-operating rod connected with the said valve and having a sliding connection with the said support, the said valve-operating rod having a head for engagement by the support to pull the valve-operating rod in one direction to open the valve on the final coupling of adjacent cars, a spring-pressed slide mounted on the said support and adapted to engage the said operating rod on uncoupling the cars, a revoluble tumbler mounted on the said support and controlling the said slide, a coupling rod slidingly engaging the said tumbler and adapted to be turned to rotate the said tumbler, and manually-controlled means for turning the said coupling rod.

7. A train pipe coupling, comprising a support depending from the draw bar of the car, a spring-pressed coupling pipe mounted to slide lengthwise on the said support and provided with a valve arranged for connection with a fluid pressure supply, a valve-operating rod connected with the said valve and having a sliding connection with the said support, the said valve-operating rod having a head for engagement by the support to pull the valve-operating rod in one direction to open the valve on the final coupling of adjacent cars, a spring-pressed slide mounted on the said support and adapted to engage the said operating rod on uncoupling the cars, a revoluble tumbler mounted on the said support and controlling the said slide, a coupling rod slidingly engaging the said tumbler and adapted to be turned to rotate the said tumbler, manually-controlled means for turning the said coupling rod, and a coupling head on the said coupling rod for engagement with a similar head on the car to be coupled, for rotating the coupling rods in unison.

8. A train pipe coupling, comprising a support depending from the draw bar of the car, a spring-pressed coupling pipe mounted to slide lengthwise on the said support and provided with a valve arranged for connection with a fluid pressure supply, a valve-operating rod connected with the said valve and having a sliding connection with the said support, the said valve-operating rod having a head for engagement by the support to pull the valve-operating rod in one direction to open the valve on the final coupling of adjacent cars, a spring-pressed slide mounted on the said support and adapted to engage the said operating rod on uncoupling the cars, a revoluble tumbler mounted on the said support and controlling the said slide, a spring pressing the said tumbler, a coupling rod having a polygonal portion slidingly engaging a correspondingly-shaped bore in the said tumbler to turn the latter on turning the coupling rod, an arm on the said coupling rod, and manually-controlled means connected with the said arm for rotating the coupling rod.

9. A train pipe coupling, comprising a support depending from the draw bar of the car, a spring-pressed coupling pipe mounted to slide lengthwise on the said support and provided with a valve arranged for connection with a fluid pressure supply, a valve-operating rod connected with the said valve and having a sliding connection with the said support, the said valve-operating rod having a head for engagement by the support to pull the valve-operating rod in one direction to open the valve on the final coupling of adjacent cars, a spring-pressed slide mounted on the said support and adapted to engage the said operating rod on uncoupling the cars, a revoluble tumbler mounted on the said support and controlling the said slide, a coupling rod slidingly engaging the said tumbler and adapted to be turned to rotate the said tumbler, manually-controlled means for turning the said coupling rod, a coupling head on the said coupling rod for engagement with a similar head on the car to be coupled for rotating the coupling rod in unison, and means for cushioning the said coupling rod.

10. A train pipe coupling, comprising a support depending from the draw bar of the car, a bearing mounted on the said support to swing up and down and sidewise, a coupling pipe mounted to slide in the said bearing, a coupling head on the forward end of the said coupling pipe, a valve on the said pipe and arranged for connection with a fluid pressure supply, a spring device connecting the coupling pipe with the said support, a valve-operating rod mounted to slide lengthwise on the said support and connected with the said valve to open and close the same, the said valve-operating rod having a head for engagement by the said support to move the valve into open position on final coupling of adjacent cars, and a spring pressed and manually-controlled slide for locking the said valve-operating rod to the support to move with the latter at the time the cars are uncoupled to move the valve into a closed position.

11. A train pipe coupling provided with a spring-pressed tumbler mounted to turn and having projections, a spring-pressed slide having lugs adapted to be engaged by the said projections, a valve, a valve-operating rod adapted to be engaged by the said slide, and manually-controlled means for turning the said tumbler.

12. A train pipe coupling, comprising a support depending from the draw bar of the car, a spring-pressed coupling pipe mounted to slide lengthwise on the said support and provided with a coupling head having a bearing, a coupling rod having a coupling head mounted to turn in the said bearing, manually-controlled means for turning the said coupling rod, a spring-pressed tumbler engaged by the said coupling rod, a spring-pressed slide controlled by the said tumbler, a valve on the said coupling pipe, and a valve-operating rod connected with the said valve and having a sliding engagement with the said support, the said rod having a head for engagement by the said support and a cut-out portion adapted to be engaged by the said slide.

13. A train pipe coupling, comprising a support depending from the draw bar of the car, a spring-pressed coupling pipe mounted to slide lengthwise on the said support and provided with a coupling head having a bearing, a valve on the said coupling pipe, a coupling rod having a coupling head mounted to turn in the said bearing, manually-controlled means for turning the said coupling rod, a spring-pressed tumbler engaged by the said coupling rod, a spring-pressed slide controlled by the said tumbler, a valve on the said coupling pipe, a valve-operating rod connected with the said valve and having a sliding engagement with the said support, the said rod having a head for engagement by the said support and a cut-out portion adapted to be engaged by the said slide, and a spring-pressed catch mounted on the said support and adapted to engage the said slide and lock the same, the catch being adapted to be released by contact with the said valve.

14. A train pipe coupling provided with a support having a vertical link, a horizontal link and an inclined link connecting the vertical link with the horizontal link, a fixed bracket on which the vertical link is pivoted, a notched plate on the horizontal link, a cross bar engaging the said notched plate, and a suspended link carrying the said cross bar.

15. A train pipe coupling provided with a coupling pipe, a coupling head on the forward end of the pipe and extending obliquely to the axis of the coupling pipe, means for the coupling pipe to slide in and to swing on spring devices and co-acting means connected with the said coupling pipe and coupling head to hold the coupling pipe and the coupling head at an angle of approach, a valve on the coupling pipe, a valve operating rod, a device mounted to turn, means controlled by said device for engaging the said operating rod, and manually controlled means for turning said device.

16. A train pipe coupling provided with a coupling pipe, a coupling head on the forward end of the pipe and extending obliquely to the axis of the coupling pipe, a bearing mounted to rock up and down and for the coupling pipe to slide in in the direction of its length, means for holding the coupling pipe and coupling head in an angular position, a valve on the coupling pipe, a valve operating rod, a revoluble member, manually controlled means for turning said revoluble member, and a sliding member for engaging the said valve operating rod and controlled by the said revoluble member.

17. A train pipe coupling provided with a coupling pipe, a coupling head on the forward end of the pipe and extending obliquely to the axis of the coupling pipe, a hanger, a bearing mounted to rock up and down on the hanger for the coupling pipe to slide in and to swing on, the said hanger having a vertical link, a horizontal link, and an inclined link connecting the vertical and horizontal link, spring devices connecting the coupling pipe with the vertical link of the hanger, a slotted bar on the coupling head, and a transverse pin extending inwardly from the inclined link of the hanger and engaging the slot in said bar.

18. A train pipe coupling, comprising a support, a coupling pipe mounted to slide on the said support and provided with a coupling head, a spring-pressed tumbler mounted to turn in said support, means for turning said tumbler, a valve on the said coupling pipe, a valve operating rod having a sliding engagement with the said support, the said rod being provided with means for engagement by the said support to move the valve into open position on final coupling of adjacent cars, and means controlled by the said tumbler for locking the said valve operating rod to the support to cause the valve operating rod to move with the support at the time the cars are uncoupled, to move the valve into a closed position.

19. A train pipe coupling, comprising a support depending from the draw bar of a car, a coupling pipe mounted to slide in the said support and provided with a coupling head having a bearing, a coupling rod mounted to turn in the said bearing, means for turning the coupling rod, a member mounted to turn in the said support, the said coupling rod engaging said member to turn the latter, means for turning the coupling rod, a valve on the coupling pipe, a valve operating rod having a sliding engagement with said support and provided with means for engagement by the support to move the valve into open position on the final coupling of adjacent cars, and a slide controlled by the said member for locking the valve operating rod to the support at the time the cars are uncoupled to move the valve into a closed position.

20. In a train pipe coupling, a support depending from the draw bar of a car, a casing connected with said support, a spring-pressed member mounted to turn in said casing and having projections, a slide projecting into said casing, the said slide having lugs adapted to be engaged by the projections on said member, a spring in said casing pressing on the slide, a coupling rod mounted to turn and engaging said member to turn the latter, manually controlled means for turning the coupling rod, a valve, and a valve operating rod adapted to be engaged by the said slide to lock the valve operating rod to the support.

21. A train pipe coupling, comprising a support, a coupling pipe mounted to slide lengthwise in said support and provided with a coupling head, a spring pressed member mounted to turn in said support, a spring pressed slide controlled by said member, a valve, a valve operating rod adapted to be engaged by the said slide to lock the said rod, manually controlled means for turning said member, and a spring pressed catch adapted to engage the said slide to lock the same.

22. In a train pipe coupling, a support, a casing attached to said support, a spring pressed tumbler mounted to turn in said casing and provided with projections, the said tumbler having a central opening, a transverse slide on the said support, the inner end of the slide projecting into the casing and terminating in a fork provided with lugs adapted to be engaged by the projections on said tumbler, a spring in said casing and pressing on said slide, a coupling rod mounted to turn and extending through the opening in the tumbler, and adapted when turned to turn the latter, manually controlled means for turning the coupling rod, a valve, and a valve operating rod adapted to be engaged by the said slide.

23. A train pipe coupling provided with a spring pressed tumbler mounted to turn and having projections, a spring pressed slide having lugs adapted to be engaged by the said projections, the said slide being provided with an opening, a valve, a valve operating rod passing through said opening in the slide and having a cut out portion, the said slide being provided at said opening with a beveled portion for engagement with the cut out portion of the valve operating rod, and manually controlled means for turning said tumbler.

24. A train pipe coupling provided with a spring pressed member mounted to turn and having a central opening, a spring pressed slide controlled by said member, a valve, a valve operating rod adapted to be engaged by the said slide, a coupling rod slidingly engaging the opening in the said member to turn the latter on turning the coupling rod, and manually controlled means for turning the coupling rod.

In testimony whereof I have signed my name to this specification in the presence of two subscribing witnesses.

HARVEY OLIVER WITWER.

Witnesses:
DAVID J. WITWER,
JOHN WITWER.